United States Patent
McGuire, Jr. et al.

(10) Patent No.: US 8,545,959 B2
(45) Date of Patent: Oct. 1, 2013

(54) COMPOSITE ARTICLES COMPRISING PROTECTIVE SHEETS AND RELATED METHODS

(75) Inventors: James E. McGuire, Jr., Columbus, OH (US); Andrew C. Strange, Worthington, OH (US)

(73) Assignee: Entrotech Composites, LLC, Columbus, OH (US)

( * ) Notice: Subject to any disclaimer, the term of this patent is extended or adjusted under 35 U.S.C. 154(b) by 632 days.

(21) Appl. No.: 12/089,395

(22) PCT Filed: Oct. 23, 2006

(86) PCT No.: PCT/US2006/060160
§ 371 (c)(1),
(2), (4) Date: Apr. 6, 2008

(87) PCT Pub. No.: WO2007/048141
PCT Pub. Date: Apr. 26, 2007

(65) Prior Publication Data
US 2008/0261014 A1    Oct. 23, 2008

(51) Int. Cl.
*B32B 3/08* (2006.01)

(52) U.S. Cl.
USPC .............. 428/76; 428/142; 428/220; 428/332; 428/423.1; 264/279

(58) Field of Classification Search
USPC ......... 428/142, 220, 332, 423.1, 76; 264/279
See application file for complete search history.

(56) References Cited

U.S. PATENT DOCUMENTS

| | | | |
|---|---|---|---|
| 3,296,196 A | 1/1967 | Lamoreaux |
| 3,463,662 A | 8/1969 | Hodes et al. |
| 3,523,100 A | 8/1970 | Stein et al. |
| 3,549,583 A | 12/1970 | Nobuyoshi et al. |
| 3,554,951 A | 1/1971 | Blomeyer et al. |
| 3,616,198 A | 10/1971 | Saito |
| 3,661,672 A | 5/1972 | McQuade, Jr. |
| 3,867,350 A | 2/1975 | Pedain et al. |

(Continued)

FOREIGN PATENT DOCUMENTS

| DE | 2600241 | 7/1977 |
| DE | 19715871 | 6/1998 |

(Continued)

OTHER PUBLICATIONS

"Argotec Fills Industry Need with Thin, Aliphatic-Grade Polyurethane Films," *Argotec Press Release*, www.argotecinc.com (2006).

(Continued)

*Primary Examiner* — Thao T. Tran
(74) *Attorney, Agent, or Firm* — The Griffith Law Firm, A P.C.; Lisa M. Griffith

(57) ABSTRACT

Methods of the invention include those for applying protective sheets to composite articles. According to these methods and resulting composite articles, a protective sheet is applied to at least a portion of an exterior surface formed from a composite material and where protection is desired. At least one exterior surface of the composite article to be protected can be integrally formed in the presence of the protective sheet. Improved bonding of the protective sheet to the composite article and improved processing efficiency are advantageously achieved according to the invention.

33 Claims, 1 Drawing Sheet

(56) References Cited

U.S. PATENT DOCUMENTS

| | | |
|---|---|---|
| 4,081,578 A | 3/1978 | Van Essen et al. |
| 4,092,198 A | 5/1978 | Scher et al. |
| 4,092,199 A | 5/1978 | Ungar et al. |
| 4,093,766 A | 6/1978 | Scher et al. |
| 4,101,698 A * | 7/1978 | Dunning et al. ............... 428/31 |
| 4,154,882 A | 5/1979 | Ungar et al. |
| 4,207,356 A | 6/1980 | Waugh |
| 4,241,140 A | 12/1980 | Ammons |
| 4,269,945 A * | 5/1981 | Vanderhider et al. ......... 521/159 |
| 4,296,156 A | 10/1981 | Lustig et al. |
| 4,371,686 A | 2/1983 | Yamamoto et al. |
| 4,420,525 A | 12/1983 | Parks |
| 4,476,293 A | 10/1984 | Robinson |
| 4,550,052 A | 10/1985 | Malek |
| 4,657,795 A | 4/1987 | Foret |
| 4,748,192 A | 5/1988 | Smith |
| 4,751,121 A | 6/1988 | Kuhnel et al. |
| 4,774,043 A | 9/1988 | Beckmann |
| 4,810,540 A | 3/1989 | Ellison et al. |
| 4,900,611 A | 2/1990 | Carroll |
| 4,913,760 A | 4/1990 | Benson et al. |
| 4,919,994 A | 4/1990 | Incremona et al. |
| 4,933,237 A | 6/1990 | Krenceski et al. |
| 4,948,654 A * | 8/1990 | Brooks et al. ............... 428/201 |
| 5,000,903 A * | 3/1991 | Matzinger et al. ............ 264/511 |
| 5,034,275 A | 7/1991 | Pearson et al. |
| 5,055,346 A | 10/1991 | Rohrbacher |
| 5,070,172 A | 12/1991 | Hirai et al. |
| 5,077,373 A | 12/1991 | Tsuda et al. |
| 5,114,514 A | 5/1992 | Landis |
| 5,114,789 A | 5/1992 | Reafler |
| 5,123,814 A * | 6/1992 | Burdick et al. ............... 416/224 |
| 5,203,189 A | 4/1993 | Lovejoy et al. |
| 5,215,811 A | 6/1993 | Reafler et al. |
| 5,219,643 A | 6/1993 | Schmidt et al. |
| 5,232,527 A | 8/1993 | Vernhet et al. |
| 5,242,751 A | 9/1993 | Hartman |
| 5,268,215 A | 12/1993 | Krenceski et al. |
| 5,288,356 A | 2/1994 | Benefiel |
| 5,306,548 A | 4/1994 | Zabrocki et al. |
| 5,310,080 A | 5/1994 | Figge |
| 5,334,450 A | 8/1994 | Zabrocki et al. |
| 5,391,686 A | 2/1995 | Jadhav et al. |
| 5,405,675 A | 4/1995 | Sawka et al. |
| 5,468,532 A | 11/1995 | Ho et al. |
| 5,486,096 A | 1/1996 | Hertel et al. |
| 5,518,786 A | 5/1996 | Johnson et al. |
| 5,556,677 A | 9/1996 | Quigley et al. |
| 5,562,979 A * | 10/1996 | Easterlow et al. ............ 428/327 |
| 5,587,230 A | 12/1996 | Lin et al. |
| 5,604,006 A | 2/1997 | Ponchaud et al. |
| 5,620,819 A | 4/1997 | Conforti et al. |
| 5,688,571 A | 11/1997 | Quigley et al. |
| 5,707,941 A | 1/1998 | Haberle |
| 5,768,285 A | 6/1998 | Griep et al. |
| 5,770,313 A | 6/1998 | Furumoto et al. |
| 5,786,285 A | 7/1998 | Walla et al. |
| 5,849,168 A | 12/1998 | Lutz |
| 5,866,257 A | 2/1999 | Schledjewski et al. |
| 5,912,081 A | 6/1999 | Negele et al. |
| 5,912,193 A | 6/1999 | Iwata et al. |
| 5,912,195 A | 6/1999 | Walla et al. |
| 5,928,778 A | 7/1999 | Takahashi et al. |
| 5,955,204 A | 9/1999 | Yamamoto et al. |
| 5,965,256 A | 10/1999 | Barrera |
| 5,968,444 A | 10/1999 | Yamamoto |
| 5,985,079 A | 11/1999 | Ellison |
| 6,001,906 A | 12/1999 | Golumbic |
| 6,054,208 A | 4/2000 | Rega et al. |
| 6,132,864 A | 10/2000 | Kiriazis et al. |
| 6,153,718 A | 11/2000 | Imashiro et al. |
| 6,177,189 B1 | 1/2001 | Rawlings et al. |
| 6,254,712 B1 | 7/2001 | Enlow et al. |
| 6,319,353 B1 | 11/2001 | Mussig |
| 6,369,186 B1 | 4/2002 | Branlard et al. |
| 6,383,644 B2 | 5/2002 | Fuchs |
| 6,389,602 B1 | 5/2002 | Alsaffar |
| 6,436,531 B1 | 8/2002 | Kollaja et al. |
| 6,475,616 B1 | 11/2002 | Dietz et al. |
| 6,485,836 B2 | 11/2002 | Reihs et al. |
| 6,518,359 B1 | 2/2003 | Clemens et al. |
| 6,518,389 B1 | 2/2003 | Kaufhold et al. |
| 6,579,601 B2 | 6/2003 | Kollaja et al. |
| 6,592,173 B2 | 7/2003 | Hardgrive et al. |
| 6,602,591 B1 | 8/2003 | Smith |
| 6,607,831 B2 | 8/2003 | Ho et al. |
| 6,612,944 B1 | 9/2003 | Bureau |
| 6,624,276 B2 | 9/2003 | Lamers et al. |
| 6,627,018 B1 | 9/2003 | O'Neill et al. |
| 6,638,467 B1 | 10/2003 | Yamamoto |
| 6,642,159 B1 | 11/2003 | Bhatnagar et al. |
| 6,649,003 B1 | 11/2003 | Spain et al. |
| 6,649,693 B2 | 11/2003 | Konishi et al. |
| 6,651,011 B1 | 11/2003 | Bache |
| 6,659,625 B2 * | 12/2003 | Hanasaki .................. 362/311.04 |
| 6,673,428 B1 | 1/2004 | Reafler |
| 6,677,028 B1 | 1/2004 | Lasch et al. |
| 6,680,111 B1 | 1/2004 | Leibler et al. |
| 6,682,679 B1 | 1/2004 | Marentic et al. |
| 6,709,723 B2 | 3/2004 | Roys et al. |
| 6,709,748 B1 | 3/2004 | Ho et al. |
| 6,713,185 B2 | 3/2004 | Carlson et al. |
| 6,723,427 B1 | 4/2004 | Johnson et al. |
| 6,723,472 B2 | 4/2004 | Nakanishi et al. |
| 6,730,388 B2 * | 5/2004 | MacQueen et al. ........... 428/141 |
| 6,733,870 B2 | 5/2004 | Enlow et al. |
| 6,734,273 B2 | 5/2004 | Onder |
| 6,755,757 B2 | 6/2004 | Sutherland |
| 6,762,243 B2 | 7/2004 | Stender et al. |
| 6,770,360 B2 | 8/2004 | Mientus et al. |
| 6,790,525 B2 * | 9/2004 | Takeuchi et al. ............... 428/339 |
| 6,790,526 B2 | 9/2004 | Vargo et al. |
| 6,797,098 B2 | 9/2004 | Watanabe et al. |
| 6,806,212 B2 | 10/2004 | Fyfe |
| 6,824,834 B2 | 11/2004 | Schafheutle et al. |
| 6,827,895 B1 | 12/2004 | Yamamoto |
| 6,835,267 B1 | 12/2004 | Spain et al. |
| 6,838,130 B1 | 1/2005 | Spain et al. |
| 6,852,268 B1 | 2/2005 | Valyi et al. |
| 6,852,418 B1 | 2/2005 | Zurbig et al. |
| 6,866,383 B2 | 3/2005 | Naik et al. |
| 6,869,496 B1 | 3/2005 | Kollaja et al. |
| 6,881,856 B2 | 4/2005 | Tanaka et al. |
| 6,890,628 B2 | 5/2005 | Kerr |
| 6,893,596 B2 | 5/2005 | Haas et al. |
| 6,908,401 B2 | 6/2005 | Cheng |
| 6,998,084 B2 | 2/2006 | Horansky |
| 7,005,103 B2 | 2/2006 | Smith et al. |
| 7,005,794 B2 | 2/2006 | Watanabe et al. |
| 7,011,777 B2 | 3/2006 | Schmidt |
| 7,048,989 B2 | 5/2006 | Watkins et al. |
| 7,108,618 B2 | 9/2006 | Frischmon et al. |
| 7,128,669 B2 | 10/2006 | Blotteaux |
| 7,141,294 B2 | 11/2006 | Sakurai et al. |
| 7,141,303 B2 | 11/2006 | Clemens et al. |
| 7,166,249 B2 | 1/2007 | Abrams et al. |
| 7,282,533 B2 * | 10/2007 | Kreitschmann et al. ...... 524/590 |
| 7,316,832 B2 | 1/2008 | Steinhardt et al. |
| 7,931,954 B2 * | 4/2011 | Kobayashi et al. ........ 428/195.1 |
| 8,117,679 B2 * | 2/2012 | Pierce ............... 2/424 |
| 2002/0006516 A1 | 1/2002 | Ito et al. |
| 2002/0015772 A1 | 2/2002 | Munch et al. |
| 2002/0061374 A1 | 5/2002 | O'Brien et al. |
| 2002/0195910 A1* | 12/2002 | Hus et al. .................. 312/223.2 |
| 2003/0003282 A1 | 1/2003 | Roys et al. |
| 2003/0211334 A1 | 11/2003 | Jones |
| 2004/0048073 A1 | 3/2004 | Bacon, Jr. |
| 2004/0071980 A1 | 4/2004 | McBain et al. |
| 2004/0096630 A1 | 5/2004 | Sakurazi et al. |
| 2004/0170793 A1 | 9/2004 | Linden et al. |
| 2004/0214007 A1 | 10/2004 | Brown et al. |
| 2005/0042431 A1 | 2/2005 | Wagenblast |
| 2005/0059309 A1 | 3/2005 | Tsotsis |
| 2005/0069698 A1 | 3/2005 | Eubanks et al. |

| | | | |
|---|---|---|---|
| 2005/0113194 A1 | 5/2005 | Pearson | |
| 2005/0136205 A1 | 6/2005 | Stoppelmann et al. | |
| 2005/0148404 A1 | 7/2005 | Ignatius | |
| 2005/0156358 A1 | 7/2005 | Bellefleur et al. | |
| 2005/0159060 A1 | 7/2005 | Shao | |
| 2005/0164008 A1 | 7/2005 | Rukavina | |
| 2005/0181203 A1 | 8/2005 | Rawlings et al. | |
| 2005/0191490 A1* | 9/2005 | Ton-That et al. | 428/407 |
| 2005/0214559 A1 | 9/2005 | Minoda et al. | |
| 2007/0036929 A1 | 2/2007 | Baird et al. | |
| 2007/0047099 A1 | 3/2007 | Clemens et al. | |
| 2007/0116933 A1* | 5/2007 | Kobayashi et al. | 428/172 |
| 2007/0178239 A1 | 8/2007 | Kestell et al. | |
| 2008/0003406 A1 | 1/2008 | Steelman | |
| 2008/0286576 A1 | 11/2008 | McGuire | |
| 2009/0186198 A1 | 7/2009 | McGuire | |
| 2009/0292057 A1* | 11/2009 | Handa et al. | 524/495 |
| 2010/0059167 A1 | 3/2010 | McGuire | |
| 2010/0062250 A1 | 3/2010 | Johnson et al. | |
| 2010/0068446 A1* | 3/2010 | McGuire | 428/76 |
| 2011/0045306 A1 | 2/2011 | Johnson et al. | |

FOREIGN PATENT DOCUMENTS

| | | |
|---|---|---|
| EP | 0 978 374 A2 | 2/2000 |
| EP | 1004608 | 10/2004 |
| EP | 2 463 093 | 6/2012 |
| EP | 2 463 094 | 6/2012 |
| JP | 2169228 | 6/1990 |
| JP | 2000-260252 | 9/2000 |
| JP | 2005/335120 | 12/2005 |
| WO | WO-94/13465 | 6/1994 |
| WO | WO-2007/048145 | 4/2007 |
| WO | WO-2007/120188 | 10/2007 |
| WO | WO-2008/051629 | 5/2008 |
| WO | WO-2009/041964 | 4/2009 |

OTHER PUBLICATIONS

"Aircraft Painting," *KLM Engineering & Maintenance*, www.klm-em.com (Jun. 27, 2007).
*Engineering EDGE*, Air France KLM (Jan. 2006).
"ECLIPSE High Performance Exterior Topcoat," *Akzo Nobel Aerospace Coatings*,www.akzonobelaerospace.com.
Umamaheswaran, Venkatakrishnan et al., "New Weatherable Film Technology to Eliminate Painting of Automotive Exteriors," *Society of Automotive Engineers*: 2001-01-0443, (2001).
"Epoxy Curing Agents and Modifiers: Amicure CG-1200 Curing Agent," Air Products and Chemicals (Allentown, PA) Publication No. 125-9416.7.
"Epoxy Curing Agents and Modifiers: Amicure UR Curing Agent," Air Products and Chemicals (Allentown, PA) Publication No. 125-9416.11.
"EPON Resin 828 Product Bulletin", Resolution Performance Products (Houston, TX) RP:3075-01 (Apr. 2002).
"Blade Protection Kits Keep Helicopters in the Air," *EngineeringTalk* (www.engineeringtalk.com/news/mmr/mmr102.html) (Sep. 16, 2005).
"EPON Resin Structural Reference Manual—EPON Resins—EPI-CURE Curing Agents—Heloxy Modifiers," Resolution Performance Products (Houston, TX), pp. 3i to 3-6 (2001).
"3M Aircraft Belly Protective Tape 8641 Technical Data Sheet," Minnesota Mining & Manufacturing Co. (St. Paul, MN) Publication No. 70-0703-7681-2 (Mar. 2007).

"3M Polyurethane Protective Tape 8674/8674DL Technical Data Sheet," Minnesota Mining & Manufacturing Co. (St. Paul, MN) Publication No. 60-9700-0074-5 (Nov. 2005).
"3M Polyurethane Protective Tape 8672/8672 GB Technical Data Sheet," Minnesota Mining & Manufacturing Co. (St. Paul, MN) Publication No. 78-9236-7045-5 (Nov. 2004).
"Improved Scotchgard Paint Protection Film Uses Latest 3M Technology," *3M News: SEMA Show 2005*, (Nov. 1, 2005).
"An Amazing New Automotive Finish Protection Film to Keep Your Vehicle in Showroom Condition . . . VentureShield," (http://www.venturetape.com/final/new_products.htm) VentureTape (Rockland, MA).
"Ford Pressure Sensitive Performance Testing (Venture Tape) for Test Materials: 7510 and 7514," ACT Laboratories, Inc. (Hillsdale, MI), published at: http://www.invisiblepatterns.com/pdf/AIN154314C.pdf, (Dec. 30, 2005).
"Paint Protection Film FAQ's," previously published at: http://enprodistributing.com/products/protection/faq.htm, (Jul. 12, 2005).
"Polyurethane Coatings for Automotive Exteriors," published at: http://www.bayermaterialscienceafta.com/industries/automotive/coatings.html#3.
"Scotchgard Paint Protection Film SGPF6 for Professional Applicators," 3M Technical Data Sheet 75-3469-1065-8, Minnesota Mining & Manufacturing Co. (St. Paul, MN) (Apr. 2004).
"Argotec 49510 Technical Data Sheet," Argotech, Inc. (Greenfield, MA) (Oct. 2003).
"EPON Resin 863 Technical Data Sheet," Hexion Specialty Chemicals (Houston, TX) RP:4041 (Jun. 2004).
"EPON Resins and Modifiers," Resolution Performance Products SC:3059-01 (2002).
*AircraftLog: Where Smart Solutions Take Flight*, PPG Industries, Inc. (Huntsville, AL).(May 2005), pp. 10-11 and 16.
"EPON Resin 862 Product Bulletin," Resolution Performance Products (Houston, TX) RP:4048 (Mar. 2005).
"Epoxy Curing Agents and Modifiers: Ancamine 2441 Curing Agent," Air Products and Chemicals (Allentown, PA) Publication No. 125-04-017-GLB (2004).
"CAB-O-SIL TS-720," Cabot Corporation (Billerica, MA) PDS-141 (Jan. 2006).
"Scotchgard Paint Protection Film: Application Guide for Professional Applicators," 3M Technical Update 75-3469-1102-9, Minnesota Mining & Manufacturing Co. (St. Paul, MN) (Apr. 2004).
"3M Paint Protection Film: A Clear Alternative to Vehicle Bras or Guards," 3M Automotive Aftermarket Division 75-3467-9992-9, Minnesota Mining & Manufacturing Co. (St. Paul, MN) (2003).
"3M Paint Protection Film Builds Business through the SEMA Show," *3M Holding Fast*, 3M Automotive Division (St. Paul, MN), 1(25) (2002).
"Venture Shield Paint Protection 7510," VentureTape (Rockland, MA), published at: http://www.venturetape.com/final/automotive_products.asp?id=609 (Jul. 12, 2005).
"Venture Shield—Paint Protection 7512", VentureTape (Rockland, MA), published at: http://www.venturetape.com/final/automotive_products.asp?id=610 (Jul. 12, 2005).
"Test Report—Venture Shield 7510," Bodycote Materials Testing Met-Chem Laboratory, published at: http://www.invisiblepatterns.com/pdf/067682.pdf, Letter Dated Jan. 14, 2003—Report No. 067682 (Jan. 14, 2003).
"Avery Dennison StoneShield Technical Data Sheet".

* cited by examiner

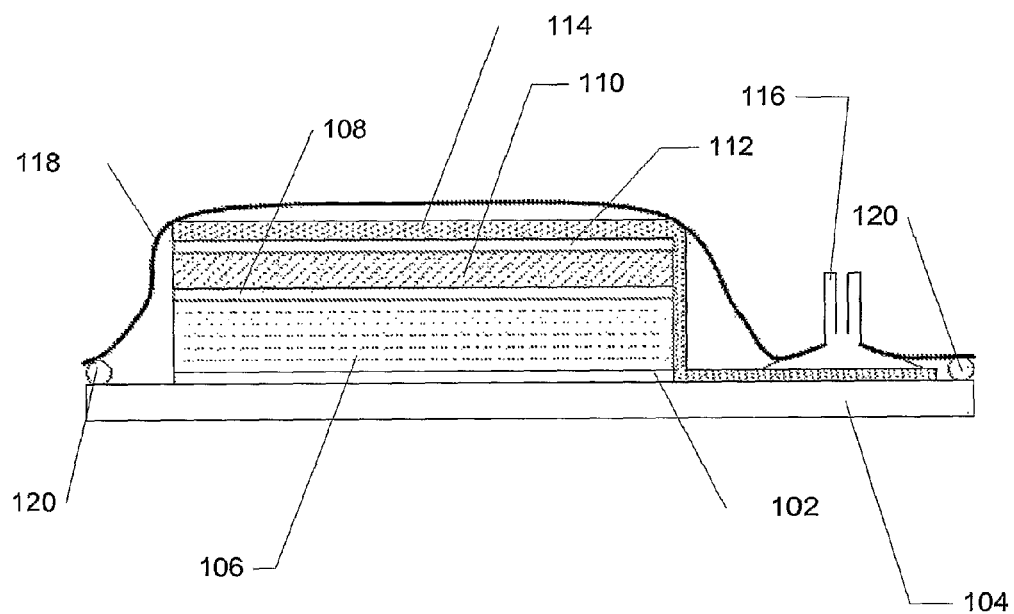

COMPOSITE ARTICLES COMPRISING PROTECTIVE SHEETS AND RELATED METHODS

BACKGROUND OF THE INVENTION

The present invention relates generally to composite articles made from composite materials and which comprise protective sheets, as well as methods of making and using the same.

A variety of protective sheets and protective coatings can be selectively applied to protect exterior surfaces on a variety of articles. Often, protective sheets and protective coverings are selectively applied to an article's surface after the article is formed. Many such applications are intended to reduce abrasion or other wear on the underlying surface. Other applications are geared primarily toward maintaining or improving aesthetics or integrity of an underlying surface (e.g., when the underlying surface contains printed material thereon or when the surface contains aesthetically undesirable pinholes, bubbles, or other surface imperfections that can occur when, for example, producing molded articles). It is not surprising that there exists a need for protective sheets and protective coatings in a variety of applications.

Certain protective sheets and protective coatings, as well as related methods for making and using the same, are known. As an example, polyurethane "clearcoat" protective coatings have been applied to a variety of finished molded parts, such as plastic body panels, in order to bolster weathering performance, as well as scratch- and abrasion-resistance, without detrimentally affecting appearance of the underlying surface. Another example involves application of polyurethane sheets to automotive body panels for protection of the body panel against chipping or other damage caused by, for example, objects such as flying stones or debris. As another example, "leading edge tapes" have been applied to select portions of articles, such as helicopter blades and aircraft noses or wings, in order to protect underlying surfaces from scratch- and abrasion-resistance.

When the underlying surface is made from a composite material (e.g., a fiber-reinforced composite), surface protection often has multiple goals within a particular application. A wide variety of composite materials and methods for their preparation and use are known. In the case of a fiber-reinforced composite, a polymeric resin matrix and fibrous reinforcement together often form the composite. A variety of materials can be used for each of the polymeric resin matrix and the fibrous reinforcement components. For example, materials useful for fibrous reinforcement include carbon fibers, boron fibers, and glass fibers. Further, examples of materials useful for the polymeric resin matrix include thermoplastics (e.g., nylon) and thermosets (e.g., epoxies and phenolics).

Composite materials are finding increased use in applications where lightweight materials are desired and where an associated compromise in strength or stiffness of the material would likely be problematic. Many composite materials are also useful in applications where corrosion resistance is desired, as composite materials more often exhibit excellent corrosion resistance as compared to alternative materials.

Due to their beneficial properties, a variety of specialized sporting implements and other articles are increasingly being made from composite materials. For example, composite materials are increasingly being used in shaft-based sporting implements (i.e., those sporting implements having a generally elongated portion, which may or may not be hollow or uniform in thickness and shape throughout) and similar articles. Such articles include, for example, golf clubs, bicycle frames, hockey sticks, lacrosse sticks, skis, ski poles, fishing rods, tennis rackets, arrows, polo mallets, and bats. As an example, the use of composite materials enables golf club manufacturers to produce shafts having varying degrees of strength, flexibility, and torsional stiffness.

In addition, a variety of articles in the transportation and energy industries are increasingly being made from composite materials. For example, composite materials are often used to make various aerospace components, such as wing and blade components, including those on helicopters and specialized military aircraft. Further, composite materials are often used to make various automotive components, both interior and exterior, including body panels, roofs, doors, gear shift knobs, seat frames, steering wheels, and others. In the energy industry, composite materials are used to make wind mill blades—e.g., large wind turbine blades are made more efficient through the use of carbon fiber-reinforced composites. Indeed, the number of current and potential applications for composite materials is extensive.

Beneficially, composite materials offer enhancements in strength, stiffness, corrosion resistance, and weight savings. These beneficial properties are often balanced against competing relative weaknesses in abrasion resistance and impact resistance. In addition, as many composite articles are made by layering multiple, individual composite material layers to achieve the desired properties, such composite articles are susceptible to interlayer delamination, particularly upon impact. This is especially the case with carbon fiber-reinforced composites (also referred to as "CFR composites"). When interlayer delamination occurs, structural integrity of such articles is compromised, sometimes leaving the composite article useless as intended. Further, in extreme cases where the composite article fractures, a sharp broken surface can result (i.e., with reinforcing fibers extending haphazardly therefrom), which impacts not only the usefulness of the article, but also the safety of those using such articles and those around them. Thus, breakage prevention and containment are also important design factors.

In order to enhance certain properties of composite articles, gel coats or similar protective coatings have conventionally been used. Gel coats often impart a glossy appearance and improve other aesthetic properties of the article. In addition, gel coats can provide some, although limited, enhancements in abrasion resistance. Gel coats or similar protective coatings are conventionally applied to composite articles that are formed by molding for, if no other reason, aesthetic enhancement. Particularly when molding articles from composite materials, surface imperfections are likely to develop, giving rise to a need for aesthetic enhancement. One mechanism for the increased number of surface imperfections in molded composite articles is associated with tiny air bubbles forming at the interface with the mold when the polymer matrix of such composites does not sufficiently flow throughout the reinforcement (e.g., fibers) during molding. The result is that the surface of the composite article, which is formed against the face of the mold, contains imperfections that can detract from a glass-like appearance otherwise desired.

There are two widely used methods of applying gel coats or similar exterior protective coatings to composite articles. The first method involves spraying the gel coat onto an exterior surface of a composite article after the article is formed (e.g., by molding). The second method involves eliminating this subsequent processing (e.g., post-molding) step by pre-applying the gel coat to the interior surface of, for example, a mold where it can then be transferred to an exterior surface of the composite article formed therein. For example, see U.S.

Pat. Nos. 4,081,578; 4,748,192; and 5,849,168. This method, which is one variation of "in-mold processing," is sometimes referred to as in-mold declaration or in-mold labeling depending on the application and materials used. Another variation in the use of in-mold processing for application of materials, although complicated and inefficient, is described in U.S. Pat. No. 5,786,285.

While gel coats are capable of improving the aesthetics of surfaces to which they are applied, they are often not capable of imparting some or all of the desired performance properties. For example, gel coats are often too thin or too hard to provide substantial levels of abrasion resistance. Further, gel coats typically do not provide significant impact resistance when used on composite articles. After extended use, gel coats also have a tendency to crack, which enables water to penetrate into articles on which they are applied. Over time, such water penetration may lead to significant structural damage of the composite article. When the article is subjected to freeze-thaw cycling (e.g., as with many aerospace parts that undergo several freeze-thaw cycles in a single day of operation), premature structural failure is often more rapid, as any water trapped within the composite article will likely produce larger cracks and similar internal damage based on such freeze-thaw cycling.

In addition to their inability to often provide desired performance properties, use of gel coats typically decreases overall processing efficiency. For example, if the gel coat is spray-applied to a surface in a post-processing step, additional labor and manufacturing time is required in conjunction therewith. Even when applied in-mold, for example, typical gel coats require cure time after application to a mold surface and before actual molding of the composite article. Such cure time can take several hours, which is obviously undesirable from the perspective of processing efficiency.

While in-mold processing is otherwise generally more efficient than post-mold application of gel coats, if printed material (e.g., a textual or graphical decal) is applied to the surface of a finished composite article, a gel coat must then be conventionally spray-applied to that surface or a protective coating or protective sheet must generally be applied over the printed material as a post-processing step. This is often necessary even if a gel coat has already been applied to the surface in-mold.

The types of materials that can be applied as a gel coat are also limited, which is undesirable as it decreases flexibility in design and manufacture of composite articles. For example, many conventional gel coat materials are two-part compounds having a relatively short pot life, which requires that they be used within a few hours of compounding or discarded. When in-mold application of gel coats is desired, additional constraints must be considered. For example, availability of certain polymer matrix systems for in-mold processing, such as those based on epoxy thermoset resins used with carbon fiber reinforcements, is very limited.

It should be noted that materials other than gel coats have been applied "in-mold" and to different types of underlying surfaces. For example, multi-layer paint replacement film has been converted to a finished product through an in-mold decoration process. This process typically involves back molding of the film to form a finished article having the paint replacement film integrally adhered to the outer surface. In-mold processing has also been utilized to construct certain specialized sporting implements such as bicycle helmets, where a foam layer is in-mold bonded to the hard outer shell of the helmet. Nevertheless, application of exterior protective coverings to surfaces, particularly those exterior surfaces formed from composite materials, is in need of improvement.

To provide higher levels of abrasion resistance or impact resistance beyond what gel coats alone can provide, protective sheets have been added to the exterior surfaces of composite articles in addition to gel coats. As compared to a protective coating, such as a gel coat, a "protective sheet" is generally applied to a surface in its cured form. In contrast, a coating is generally applied to a surface to be protected in an uncured (e.g., solution) form, after which it is cured in-situ. While a sheet may be formed using conventional extrusion, casting, or coating technology, before the sheet is applied to a surface to be protected it is cured and/or formed.

Conventional protective sheets are often applied to a surface using a pressure sensitive adhesive. Many undesirable issues can arise, however, if the pressure sensitive adhesive is not adequately designed and formulated. For example, many pressure sensitive adhesives lack adequate bond strength to prevent edge lifting of protective sheets that are adhered to an underlying surface using the same. Protective sheets applied using existing technologies are typically not permanently bonded to the underlying surface. The durability of such constructions is often short-lived, as the adhesive bond often fails during repeated use, causing the protective sheet to lift from the surface. As another example, many conventional pressure sensitive adhesives are either repositionable and/or removable. This allows conventional protective sheets, which may lack adequate extensibility for easy application to a surface (especially irregular-shaped surfaces), to be more easily applied to surfaces. However, such pressure sensitive adhesives typically lack adequate permanency. In addition, often when a pressure sensitive adhesive is used for bonding a protective sheet to an underlying surface, a gel coat or other protective coating is often used in addition to the protective sheet (e.g., a coating is applied to an underlying surface before the protective sheet is applied).

In addition to the shortcomings associated with bonding of protective sheets to an underlying surface, application of protective sheets has proven to be otherwise difficult. For example, in addition to the bonding issues arising based on the often inadequately extensible nature of conventional protective sheets, it is often difficult to apply protective sheets to surfaces with complex shapes when relatively thick or multi-layer protective sheets are used. As a result, wrinkles often exist in protective sheets so applied. Even if uniformly applied to irregular surfaces initially, over time conventional protective sheets are prone to lifting from such surfaces. In any event, the way in which protective sheets are typically applied to such surfaces generally decreases processing efficiency.

While some benefits can be obtained from application of protective sheets and protective coatings according to known methods, such conventional methods often result in composite articles that still fail to adequately address important performance and processing considerations. Not only are performance property considerations important, but for the reasons stated above, aesthetics are also often another important consideration.

When attempting to address the myriad of important considerations, however, processing efficiency is often compromised. This is the case when, for example, multiple protective sheets and/or protective coatings (e.g., gel coats) are applied to a surface. In order to improve processing efficiency, it is desirable to minimize the number of protective sheets and protective coatings such as gel coats (especially those gel coats used primarily for aesthetic enhancement) that are applied to protect surfaces of underlying composite articles. For example, if gel coats could be eliminated, processing efficiency could improve both in terms of cost and time savings associated with the otherwise required additional processing steps associated with gel coating.

BRIEF SUMMARY OF THE INVENTION

A wide variety of composite articles benefit from application of protective sheets according to the invention. Composite articles of the invention are useful in a range of indoor and outdoor applications—for example, the transportation, architectural and sporting goods industries. In certain embodiments of the invention, the composite article comprises at least a portion of a motorized vehicle, at least a portion of an aerospace component, or at least a portion of a sporting implement (e.g., a shaft-based sporting implement). For example, the composite article can comprise at least a portion of a golf club, a bicycle frame, a hockey stick, a lacrosse stick, a ski pole, a ski, a fishing rod, a tennis racket, an arrow, a polo mallet, or a bat.

According to one aspect of the invention, a composite article comprises a protective sheet integrally bonded to at least one portion thereof. According to another aspect of the invention, a composite article comprises an exterior protective sheet adhered to an underlying composite material surface, wherein the composite article is essentially free of additional layers between the protective sheet and the underlying composite material surface. According to yet another aspect of the invention, a composite article comprises a protective sheet adhered to at least one exterior portion thereof, wherein the protective sheet is capable of providing all desired enhancements in performance and aesthetic properties of the composite article in one protective sheet component as compared to use of multiple protective sheet or protective coating components.

In some embodiments, the composite article comprises printed material on at least one outwardly visible surface thereof. In some embodiments, the composite material comprises a fiber-reinforced composite. In an exemplary embodiment, at least a portion of the protective sheet is crosslinked with at least a portion of the composite article.

In one embodiment, the composite article has at least one exterior surface comprising a composite material and the protective sheet fully covers that exterior surface. In another embodiment, the composite article is fully covered by the protective sheet.

Any suitable materials can be used to form the composite article. The composite article can be based on a thermoplastic resin or a thermoset resin (e.g., an epoxy resin, such as Bisphenol-A or Bisphenol-F epoxy) in combination with a reinforcing material. In an exemplary embodiment, the composite article comprises a fiber-reinforced composite material underlying the protective sheet.

Similarly, any suitable materials can be used for the protective sheet and to form the same. Preferably, the protective sheet is extensible. In an exemplary embodiment, the protective sheet comprises at least one elastomeric material (e.g., an elastomeric material based on polyurethane, ionomer, or fluoroelastomer chemistry).

In one embodiment, the protective sheet comprises at least one polyurethane-based layer. For example, the polyurethane-based layer can comprise at least one aliphatic-based polyurethane, such as those selected from polyether-based aliphatic polyurethanes, polyester-based aliphatic polyurethanes, polycaprolactone-based aliphatic polyurethanes, and polycarbonate-based aliphatic polyurethanes. In a further embodiment, the composite article is based on at least one epoxy resin and the protective sheet comprises at least one polyurethane-based layer.

Methods of the invention include those for applying protective sheets of the invention to composite articles. According to these methods, a protective sheet is applied to at least a portion of an exterior surface formed from a composite material and where protection is desired. According to one embodiment of a method of the invention, at least one exterior surface of the composite article to be protected is integrally formed in the presence of the protective sheet.

For example, a method of applying a protective sheet to at least a portion of an exterior surface of a composite article comprises providing the protective sheet prior to forming the exterior surface of the composite article and integrally forming the exterior surface of the composite article in the presence of the protective sheet such that at least a portion of the exterior surface of the composite article and the protective sheet become integrally bonded. In order to promote crosslinking between the composite article and the protective sheet, the protective sheet can undergo thermolysis during cure of the composite article according to one aspect of the invention and depending on materials used for the various components.

In one embodiment, the exterior surface of the composite article is formed using an in-mold processing or insert-mold processing technique, such as a vacuum bag processing technique. In an exemplary embodiment, the exterior surface of the composite article comprises a fiber-reinforced composite material prior to application of the protective sheet to at least a portion thereof.

Another method of the invention comprises applying a protective sheet to at least a portion of an exterior surface of a composite article. The method comprises providing the protective sheet, forming the exterior surface of the composite article, and co-molding the protective sheet to the exterior surface of the composite article such that at least a portion of the exterior surface of the composite article and the protective sheet become integrally bonded. In one embodiment, the exterior surface of the composite article comprises a fiber-reinforced composite material.

BRIEF DESCRIPTION OF THE DRAWINGS

FIG. 1 is a cross-sectional representation of an exemplary vacuum bag processing configuration for application of protective sheets of the invention.

DETAILED DESCRIPTION OF THE INVENTION

The present invention is directed toward improved composite articles comprising a protective sheet on at least a portion of at least one exterior surface thereof. "Composite articles" of the invention are those articles comprising at least one composite material.

Composite articles are formed based on at least one matrix material and at least one reinforcing material. The combination of a matrix material (e.g., resin) and a reinforcing material (e.g., fibers) within a composite material often produces extremely strong articles that are also lightweight.

Exemplary matrix materials include epoxy resins, ester resins (e.g., vinyl esters), phenolic resins, bismaleimide resins, polyimide resins and other thermosetting resins. Epoxy resins tend to be the most common. The matrix material can also be a thermoplastic resin.

While a composite material can contain any suitable reinforcement material, fibrous reinforcement is common. Such reinforcement can be continuous or discrete. Exemplary forms of continuous fiber reinforcement include those containing woven, nonwoven, mat, braided, random, uni-directional, or other forms of continuous fibers. Typical fibrous reinforcement materials include carbon fibers, glass fibers, aramid fibers, boron fibers, polyethylene fibers, and others.

While a sheet material may be used primarily for aesthetic purposes in certain applications, such a purpose or use does not exclude such sheets from being encompassed within the definition of protective sheets referenced throughout in describing the present invention. Among other beneficial properties, the presence of the protective sheet enhances durability (e.g., abrasion resistance) of the composite article, as well as its impact resistance and fracture toughness in further embodiments.

In addition to enhanced performance properties associated with composite articles of the invention, processing efficiency is increased as compared to conventional articles and methods. According to exemplary embodiments, protective coatings (e.g., gel coats or similar protective coatings) are not needed to obtain desired properties and, thus, can be eliminated from composite articles of the invention. Such additional or inferior protective coatings are capable of being eliminated as aesthetic enhancement is typically not necessary in composite articles made according to the invention. As such, even if conventional gel coats are used within composite articles of the invention, aesthetics of the composite article would typically be essentially the same as those of comparable articles without the gel coat.

In essence, protective sheets of the invention and methods of their application are capable of providing all desired performance and aesthetic properties in one component and without requiring use of multiple protective sheets and/or multiple protective coatings in order to obtain comparable properties. By eliminating undesirable protective coatings and multiple protective layers, additional processing steps associated with conventional methods for protection of composite surfaces are likewise eliminated. Similarly, additional processing time associated therewith, such as when a gel coat is applied in-mold in a way that requires cure time after application to a mold surface and before actual molding of the composite article, is also eliminated.

Even when printed material is included on an exterior surface of a composite article, addition of a protective coating after application thereof to the surface is not required according to an exemplary embodiment of the invention. According to this embodiment, any printed material desired to be placed on an exterior surface of a composite article is pre-printed onto a protective sheet prior to its bonding to the underlying composite article. The protective sheet is then applied to the surface of an underlying composite article such that the printed material is outwardly visible.

Composite articles comprising protective sheets according to the invention are useful in a range of indoor and outdoor applications—for example, the transportation, architectural and sporting goods industries. An exemplary embodiment of the invention relates to composite articles used in the automotive industry. Such articles include, for example, interior trim components (e.g., door handles, steering wheels, and gear shift knobs), internal mechanical components (e.g., drive shaft components), and exterior components (e.g., door panels, other body panels, roofs, fenders, hoods, and bumpers).

An exemplary embodiment of the invention relates to shaft-based sporting implements and similar articles. Such articles include, for example, golf clubs, bicycle frames, hockey sticks, lacrosse sticks, skis, ski poles, fishing rods, tennis rackets, arrows, polo mallets, and bats. According to a preferred aspect of this embodiment, the portion of the surface where the protective sheet is applied is not the primary surface for impact by a ball, puck, or other object (i.e., the surface is not what may be commonly referred to as the "contact surface"). For example, when the composite article is a hockey stick, the protective sheet is preferably applied to the shaft as opposed to the blade. Similarly, when the composite article is a golf club, the protective sheet is preferably applied to the shaft as opposed to the club head. Likewise, when the composite article is a lacrosse stick, the protective sheet is preferably applied to the handle as opposed to the pocket. When the composite article is a baseball bat, the protective sheet is preferably applied to the handle as opposed to the barrel.

In certain applications, the presence of the protective sheet can mean the difference between having a usable piece of sporting equipment and/or one that is safe. For example, when a cross country skier's pole breaks during a race they must either forfeit the race or be lucky enough to be given another pole to use. As a further example, it is not uncommon to break several hockey sticks during a game. Each time conventional technology is used, the hockey stick has the potential to severely injure another person or the player as its shape can readily transform into that of a spear-like object when broken. By using composite articles of the present invention, the equipment may still be usable (e.g., as in the case of the cross country ski pole) or at least resist total failure for a longer period of time. In addition, when composite articles of the present invention are used, the equipment may be prevented from injuring somebody upon failure (e.g., as in the case of a splintered hockey stick).

In certain embodiments, advantages of the invention are maximized when the protective sheet is applied to substantially cover the entire underlying surface. That is, the protective sheet fully covers the underlying composite material. In comparison, partial coverage of an underlying composite material may not adequately contain or prevent breakage of the overall composite article in those applications. Thus, in an exemplary embodiment, the protective sheet is applied to fully cover the underlying composite material within a composite article. In a further embodiment, the protective sheet is applied to fully cover the overall underlying composite article or an individual component thereof.

Advantages of the invention are more fully realized when the surface to which the protective sheet is applied is rigid, as is the case with most composite materials. "Rigid" refers to those surfaces that are inflexible in that they do not easily bend or substantially change shape when pressure is applied thereto. Rigidity is often imparted when using fiber-reinforced composite materials. Thus, in an exemplary embodiment, the composite article to which the protective sheet is applied comprises a fiber-reinforced composite material. As known to those skilled in the art, a wide variety of materials can be used as the fibrous reinforcement. In sporting implements, however, carbon fibers are the predominantly used fibrous reinforcement.

In a further embodiment, the composite article comprises at least one protective sheet integrally bonded to an underlying surface. According to this embodiment, performance benefits from the presence of the protective sheet are further enhanced and more reliable than when the protective sheet is not integrally bonded as such. "Integrally bonded" refers to those materials with bonds formed between the protective sheet and underlying composite article that are essentially permanent in nature. Removal of an integrally bonded protective sheet typically requires more force than that required to separate the same protective sheet adhered using certain pressure sensitive adhesives (e.g., those pressure sensitive adhesives having low shear and low tack, removability, repositionability, or similar properties) that do not facilitate formation of permanent or durable bonds. Integrally bonded protective sheets are better able to contain underlying composite materials than conventionally adhered protective sheets due to the reduced chances that their bonds to underlying surfaces will fail.

According to the invention, at least one protective sheet is integrally bonded to at least a portion of at least one surface of an underlying composite article. Protective sheets of the invention are formed using any suitable method. In one embodiment, the protective sheet is generally planar. In exemplary embodiments, however, protective sheets are also pre-formed into a shape approximating the shape of the surface onto which it is to be adhered. This simplifies the process of adequately adhering the protective sheet to the surface and can be done, for example, by thermoforming or injection molding. Whatever the method used for its fabrication, the protective sheet is formed separately from formation of the exterior surface of the composite article to which it will be applied. Thus, for example, protective sheets of the invention do not require, and generally do not include, protective coatings formed by spray coating a surface of a composite article with a composition that forms a protective layer on the surface.

The protective sheet can be any suitable thickness. In one embodiment, protective sheets of the invention are about 50 μm (0.002 inch) to about 1.1 mm (0.045 inch) thick at their maximum thickness. In a further embodiment, protective sheets of the invention are about 80 μm (0.003 inch) to about 0.64 mm (0.025 inch) thick at their maximum thickness. In still further embodiments, protective sheets of the invention are about 0.15 mm (6 mils) to about 0.38 mm (15 mils) thick at their maximum thickness.

The protective sheet can be any suitable material and may include one or more layers. Protective sheets of the invention comprise at least a base layer and, optionally, topcoat or other layers. The use of multiple layers within a protective sheet imparts flexibility in design of protective sheets. While there may be protective sheets that do not involve multiple layers, but rather one layer, certain performance properties can often be better achieved when using a protective sheet comprising multiple layers.

In an exemplary embodiment, the protective sheet comprises one or more elastomeric materials. Elastomeric materials are preferably those polymeric materials exhibiting about 200% or greater elastic elongation. Elastomeric materials are preferred for use in the protective sheets of the invention because such materials are highly resilient and exhibit compressive recovery. Thus, elastomeric materials can enhance impact resistance, abrasion resistance, and other similar performance properties of surfaces and articles to which protective sheets comprising the same are applied. Further, elastomeric materials are generally highly extensible and conformable. Thus, when used in protective sheets of the invention, such materials ease application of such protective sheets to articles or molds of varying dimensions and shape. Exemplary elastomeric films include those based on polyurethane, ionomer, and fluoroelastomer chemistries. Extensible protective sheets are formed according to one aspect of this embodiment.

The terms "extensible" and "extensibility" refer to a material's ductility and its ability to be stretched and recover to essentially its original state after stretching. Extensible protective sheets are capable of recovering to their original state when stretched (i.e., elongated) up to about 125% of their initial length or more. Preferably, extensible protective sheets are capable of recovering to their original state when stretched up to about 150% of their initial length or more.

According to one aspect of the invention, extensible protective sheets are capable of elongating more than 200% before breaking. Further preferable are extensible protective sheets that exhibit essentially no plastic deformation when stretched up to about 150% of their initial length.

According to one aspect of the invention, extensible protective sheets of the invention exhibit greater than about 210% elongation at break when tested according to the Tensile Testing Method described below. In a further embodiment, extensible protective sheets of the invention exhibit greater than about 260% elongation at break when tested according to the Tensile Testing Method described below. In a still further embodiment, extensible protective sheets of the invention exhibit greater than about 300% elongation at break when tested according to the Tensile Testing Method described below. In a further embodiment still, extensible protective sheets of the invention exhibit greater than about 350% elongation at break when tested according to the Tensile Testing Method described below.

According to another aspect of the invention, extensible protective sheets of the invention exhibit less than about 3% deformation after 25% elongation when tested according to the Recovery Testing Method described below. In a further embodiment, extensible protective sheets of the invention exhibit less than about 2% deformation after 25% elongation when tested according to the Recovery Testing Method described below. In a still further embodiment, extensible protective sheets of the invention exhibit less than about 1% deformation after 25% elongation when tested according to the Recovery Testing Method described below.

According to another aspect of the invention, extensible protective sheets of the invention exhibit less than about 8% deformation after 50% elongation when tested according to the Recovery Testing Method described below. In a further embodiment, extensible protective sheets of the invention exhibit less than about 5% deformation after 50% elongation when tested according to the Recovery Testing Method described below. In a still further embodiment, extensible protective sheets of the invention exhibit less than about 2% deformation after 50% elongation when tested according to the Recovery Testing Method described below.

According to another aspect of the invention, extensible protective sheets of the invention require a force of less than about 40 Newtons to elongate the sheet to 150% its initial length. In a further embodiment, extensible protective sheets of the invention require a force of less than about 30 Newtons to elongate the sheet to 150% its initial length. In yet a further embodiment, extensible protective sheets of the invention require a force of less than about 20 Newtons to elongate the sheet to 150% its initial length.

In an exemplary embodiment, protective sheets of the invention are polyurethane-based in that they comprise at least one polyurethane-based layer. For simplicity, the term "polyurethane" as used herein includes polymers containing urethane (also known as carbamate) linkages, urea linkages, or combinations thereof (i.e., in the case of poly(urethane-urea)s). Thus, polyurethanes of the invention contain at least urethane linkages and, optionally, urea linkages. In one embodiment, polyurethane-based layers of the invention are based on polyurethanes where the backbone has at least about 80% urethane and/or urea repeat linkages formed during their polymerization.

Polyurethane chemistry is well known to those of ordinary skill in the art. Polyurethane-based layers of the invention can contain polyurethane polymers of the same or different chemistries, the latter commonly understood to be a polymer blend. Polyurethanes generally comprise the reaction product of at least one isocyanate-reactive component, at least one isocyanate-functional component, and one or more other optional components such as emulsifiers and chain extending agents.

Components of polyurethanes are further described below, with reference to certain terms understood by those in the chemical arts as referring to certain hydrocarbon groups. Reference is also made throughout to polymeric versions thereof. In that case, the prefix "poly" is inserted in front of the name of the corresponding hydrocarbon group. Except where otherwise noted, such hydrocarbon groups, as used herein, may include one or more heteroatoms (e.g., oxygen, nitrogen, sulfur, or halogen atoms), as well as functional groups (e.g., oxime, ester, carbonate, amide, ether, urethane, urea, carbonyl groups, or mixtures thereof).

The term "aliphatic group" means a saturated or unsaturated, linear, branched, or cyclic hydrocarbon group. This term is used to encompass alkylene (e.g., oxyalkylene), aralkylene, and cycloalkylene groups, for example.

The term "alkylene group" means a saturated, linear or branched, divalent hydrocarbon group. Particularly preferred alkylene groups are oxyalkylene groups. The term "oxyalkylene group" means a saturated, linear or branched, divalent hydrocarbon group with a terminal oxygen atom. The term "aralkylene group" means a saturated, linear or branched, divalent hydrocarbon group containing at least one aromatic group. The term "cycloalkylene group" means a saturated, linear or branched, divalent hydrocarbon group containing at least one cyclic group. The term "oxycycloalkylene group" means a saturated, linear or branched, divalent hydrocarbon group containing at least one cyclic group and a terminal oxygen atom. The term "aromatic group" means a mononuclear aromatic hydrocarbon group or polynuclear aromatic hydrocarbon group. The term includes arylene groups. The term "arylene group" means a divalent aromatic group.

Any suitable method can be used for preparation of polyurethanes for use in polyurethane-based protective sheets of the invention. In one embodiment, the polyurethane is prepared and formed into a single layer using an extruder. The polyurethane can also be blown to form a single layer.

Many commercially available polyurethanes are available and suitable for use in preparing protective sheets of the invention. Extrusion grade polyurethanes can be used in certain embodiments of the invention. Extrusion grade polyurethanes include those available from Stevens Urethane of Easthampton, Mass. Aliphatic polyurethanes from Stevens Urethane, for example, those designated SS-1219-92 and SS-2219-92. Suitable polyurethanes are also available from Thermedics (Noveon, Inc.) of Wilmington, Mass., under the TECOFLEX trade designation (e.g., CLA-93AV) and from Bayer MaterialScience LLC of Pittsburgh, Pa., under the TEXIN trade designation (e.g., aliphatic ester-based polyurethane suitable as a base polymer for polyurethane-based layers of the invention is available under the trade designation, TEXIN DP7-3008). Polycaprolactone-based aliphatic polyurethane is available from Argotec, Inc. of Greenfield, Mass. under the trade designation, ARGOTEC 49510. Polyether-based aliphatic thermoplastic polyurethane is available from Argotec, Inc. of Greenfield, Mass. under the trade designations, ARGOTEC PE-399 and ARGOTEC PE-192. Similar polyurethanes are available from Stephens Urethane of Easthampton, Mass., under the trade designations, AG8451 and AG8320. Still further, similar polyurethanes are available from Deerfield Urethane, Inc. of Whately, Mass. (a Bayer MaterialScience company) under the trade designations Deerfield Urethane A4700 and Deerfield Urethane A4100. Polyester-based aliphatic polyurethanes are also suitable for use in the invention. Polycarbonate-based polyurethanes, such as those described in U.S. Pat. No. 4,476,293 are likewise suitable for use in the invention. In addition, U.S. Pat. Nos. 5,077,373 and 6,518,389 describe further suitable polyurethanes.

In another embodiment, polyurethane can be prepared and formed into a single layer using solution or dispersion chemistry and coating techniques known to those skilled in the art. Such a layer can be prepared by reacting components, including at least one isocyanate-reactive component, at least one isocyanate-functional component, and, optionally, at least one reactive emulsifying compound, to form an isocyanate-terminated polyurethane prepolymer. The polyurethane prepolymer can then be dispersed, and optionally chain-extended, in a dispersing medium to form a polyurethane-based dispersion that can be cast to form a layer of polyurethane. When polyurethane is prepared from an organic solventborne or waterborne system, once the solution or dispersion is formed, it is easily applied to a substrate and then dried to form a polyurethane layer. As known to those of ordinary skill in the art, drying can be carried out either at room temperature (i.e., about 20° C.) or at elevated temperatures (e.g., about 25° C. to about 150° C.). For example, drying can optionally include using forced air or a vacuum. This includes the drying of static-coated substrates in ovens, such as forced air and vacuum ovens, or drying of coated substrates that are continuously conveyed through chambers heated by forced air, high-intensity lamps, and the like. Drying may also be performed at reduced (i.e., less than ambient) pressure.

Any suitable isocyanate-reactive component can be used in this embodiment of the present invention. The isocyanate-reactive component contains at least one isocyanate-reactive material or mixtures thereof. As understood by one of ordinary skill in the art, an isocyanate-reactive material includes at least one active hydrogen. Those of ordinary skill in the polyurethane chemistry art will understand that a wide variety of materials are suitable for this component. For example, amines, thiols, and polyols are isocyanate-reactive materials.

It is preferred that the isocyanate-reactive material be a hydroxy-functional material. Polyols are the preferred hydroxy-functional material used in the present invention. Polyols provide urethane linkages when reacted with an isocyanate-functional component, such as a polyisocyanate.

Polyols, as opposed to monols, have at least two hydroxy-functional groups. Diols contribute to formation of relatively high molecular weight polymers without requiring crosslinking, such as is conventionally introduced by polyols having greater than two hydroxy-functional groups. Examples of polyols useful in the present invention include, but are not limited to, polyester polyols (e.g., lactone polyols) and the alkylene oxide (e.g., ethylene oxide; 1,2-epoxypropane; 1,2-epoxybutane; 2,3-epoxybutane; isobutylene oxide; and epichlorohydrin) adducts thereof, polyether polyols (e.g., polyoxyalkylene polyols, such as polypropylene oxide polyols, polyethylene oxide polyols, polypropylene oxide polyethylene oxide copolymer polyols, and polyoxytetramethylene polyols; polyoxycycloalkylene polyols; polythioethers; and alkylene oxide adducts thereof), polyalkylene polyols, polycarbonate polyols, mixtures thereof, and copolymers therefrom.

Polycarbonate-based polyurethanes are preferred according to one embodiment. It was found that this type of polyurethane chemistry easily facilitated obtainment of polyurethane-based protective sheets with properties desired. See U.S. Pat. No. 4,476,293 for a description of exemplary polycarbonate-based polyurethanes.

In one preferred embodiment, a polycarbonate diol is used to prepare polycarbonate-based polyurethane according to the invention. Although polyols containing more than two hydroxy-functional groups are generally less preferred than diols, certain higher functional polyols may also be used in the present invention. These higher functional polyols may be used alone, or in combination with other isocyanate-reactive materials, for the isocyanate-reactive component.

For broader formulation latitude, at least two isocyanate-reactive materials, such as polyols, may be used for the isocyanate-reactive component. However, as any suitable isocyanate-reactive component can be used to form the polyurethane, much latitude is provided in the overall polyurethane chemistry.

The isocyanate-reactive component is reacted with an isocyanate-functional component during formation of the polyurethane. The isocyanate-functional component may contain one isocyanate-functional material or mixtures thereof. Polyisocyanates, including derivatives thereof (e.g., ureas, biurets, allophanates, dimers and trimers of polyisocyanates, and mixtures thereof), (hereinafter collectively referred to as "polyisocyanates") are the preferred isocyanate-functional materials for the isocyanate-functional component. Polyisocyanates have at least two isocyanate-functional groups and provide urethane linkages when reacted with the preferred hydroxy-functional isocyanate-reactive components. In one embodiment, polyisocyanates useful for preparing polyurethanes are one or a combination of any of the aliphatic or aromatic polyisocyanates commonly used to prepare polyurethanes.

Generally, diisocyanates are the preferred polyisocyanates. Useful diisocyanates include, but are not limited to, aromatic diisocyanates, aromatic-aliphatic diisocyanates, aliphatic diisocyanates, cycloaliphatic diisocyanates, and other compounds terminated by two isocyanate-functional groups (e.g., the diurethane of toluene-2,4-diisocyanate-terminated polypropylene oxide polyol).

Examples of preferred diisocyanates include the following: 2,6-toluene diisocyanate; 2,5-toluene diisocyanate; 2,4-toluene diisocyanate; phenylene diisocyanate; 5-chloro-2,4-toluene diisocyanate; 1-chloromethyl-2,4-diisocyanato benzene; xylylene diisocyanate; tetramethyl-xylylene diisocyanate; 1,4-diisocyanatobutane; 1,6-diisocyanatohexane; 1,12-diisocyanatododecane; 2-methyl-1,5-diisocyanatopentane; methylenedicyclohexylene-4,4'-diisocyanate; 3-isocyanatomethyl-3,5,5'-trimethylcyclohexyl isocyanate (isophorone diisocyanate); 2,2,4-trimethylhexyl diisocyanate; cyclohexylene-1,4-diisocyanate; hexamethylene-1,6-diisocyanate; tetramethylene-1,4-diisocyanate; cyclohexane-1,4-diisocyanate; naphthalene-1,5-diisocyanate; diphenylmethane-4,4'-diisocyanate; hexahydro xylylene diisocyanate; 1,4-benzene diisocyanate; 3,3'-dimethoxy-4,4'-diphenyl diisocyanate; phenylene diisocyanate; isophorone diisocyanate; polymethylene polyphenyl isocyanate; 4,4'-biphenylene diisocyanate; 4-isocyanatocyclohexyl-4'-isocyanatophenyl methane; and p-isocyanatomethyl phenyl isocyanate.

When preparing polyurethane dispersions for casting into layers of polyurethane, the isocyanate-reactive and isocyanate-functional components may optionally be reacted with at least one reactive emulsifying compound according to one embodiment of the invention. The reactive emulsifying compound contains at least one anionic-functional group, cationic-functional group, group that is capable of forming an anionic-functional group or cationic-functional group, or mixtures thereof. This compound acts as an internal emulsifier because it contains at least one ionizable group. Thus, these compounds are generally referred to as "reactive emulsifying compounds."

Reactive emulsifying compounds are capable of reacting with at least one of the isocyanate-reactive and isocyanate-functional components to become incorporated into the polyurethane. Thus, the reactive emulsifying compound contains at least one, preferably at least two, isocyanate- or active hydrogen-reactive- (e.g., hydroxy-reactive) groups. Isocyanate- and hydroxy-reactive groups include, for example, isocyanate, hydroxyl, mercapto, and amine groups.

Preferably, the reactive emulsifying compound contains at least one anionic-functional group or group that is capable of forming such a group (i.e., an anion-forming group) when reacted with the isocyanate-reactive (e.g., polyol) and isocyanate-functional (e.g., polyisocyanate) components. The anionic-functional or anion-forming groups of the reactive emulsifying compound can be any suitable groups that contribute to ionization of the reactive emulsifying compound. For example, suitable groups include carboxylate, sulfate, sulfonate, phosphate, and similar groups. As an example, dimethylolpropionic acid (DMPA) is a useful reactive emulsifying compound. Furthermore, 2,2-dimethylolbutyric acid, dihydroxymaleic acid, and sulfopolyester diol are other useful reactive emulsifying compounds. Those of ordinary skill in the art will recognize that a wide variety of reactive emulsifying compounds are useful in preparing polyurethanes for the present invention.

One or more chain extenders can also be used in preparing polyurethanes of the invention. For example, such chain extenders can be any or a combination of the aliphatic polyols, aliphatic polyamines, or aromatic polyamines conventionally used to prepare polyurethanes.

Illustrative of aliphatic polyols useful as chain extenders include the following: 1,4-butanediol; ethylene glycol; 1,6-hexanediol; glycerine; trimethylolpropane; pentaerythritol; 1,4-cyclohexane dimethanol; and phenyl diethanolamine. Also note that diols such as hydroquinone bis(β-hydroxyethyl)ether; tetrachlorohydroquinone-1,4-bis(β-hydroxyethyl)ether; and tetrachlorohydroquinone-1,4-bis(β-hydroxyethyl)sulfide, even though they contain aromatic rings, are considered to be aliphatic polyols for purposes of the invention. Aliphatic diols of 2-10 carbon atoms are preferred. Especially preferred is 1,4-butanediol.

Illustrative of useful polyamines are one or a combination of the following: p,p'-methylene dianiline and complexes thereof with alkali metal chlorides, bromides, iodides, nitrites and nitrates; 4,4'-methylene bis(2-chloroaniline); dichlorobenzidine; piperazine; 2-methylpiperazine; oxydianiline; hydrazine; ethylenediamine; hexamethylenediamine; xylylenediamine; bis(p-aminocyclohexyl)methane; dimethyl ester of 4,4'-methylenedianthranilic acid; p-phenylenediamine; m-phenylenediamine; 4,4'-methylene bis(2-methoxyaniline); 4,4'-methylene bis(N-methylaniline); 2,4-toluenediamine; 2,6-toluenediamine; benzidine; 3,4'-dimethylbenzidine; 3,3'-dimethoxybenzidine; dianisidine; 1,3-propanediol bis(p-aminobenzoate); isophorone diamine; 1,2-bis(2'-aminophenylthio)ethane; 3,5-diethyl toluene-2,4-diamine; and 3,5-diethyl toluene-2,6-diamine. The amines preferred for use are 4,4'-methylene bis(2-chloroaniline); 1,3-propanediol bis(p-aminobenzoate); and p,p'-methylenedianiline and complexes thereof with alkali metal chlorides, bromides, iodides, nitrites and nitrates.

Any suitable additives can be present in protective sheets of the invention. Many different types of additives can be used and are readily available. For example, stabilizers, antioxidants, plasticizers, tackifiers, adhesion promoters (e.g., silanes, glycidyl methacrylate, and titanates), lubricants, colorants, pigments, dyes, polymeric additives (e.g., polyacetals, reinforcing copolymers, and polycaprolactone diols), and the like can be used in certain embodiments of the invention. In certain embodiments, however, use of additives detracting from optical clarity of the protective sheet are minimized or eliminated. Such additives include, for example, fiber- or other matrix-reinforcements typically present in composite materials. Thus, in this exemplary embodiment, the protective sheet itself would not be considered to be a composite material according to those skilled in the art.

According to another embodiment, polyurethane-based protective sheets of the invention comprise multiple layers (e.g., a carrier and a topcoat), at least one of which is polyurethane-based. According to one variation of this embodiment, the carrier and the topcoat layers are both polyurethane-based. In such an embodiment, the carrier preferably comprises a polyurethane-based layer as discussed above with respect to a single layer protective sheet of the invention. According to another variation of this embodiment, polyurethane-based protective sheets of the invention comprise a polyurethane-based topcoat and a carrier layer that may or may not be polyurethane-based.

When forming a protective sheet comprising a topcoat layer, the topcoat can be formed using any suitable method. In addition, the topcoat can be crosslinked or uncrosslinked. An uncrosslinked topcoat can be prepared from polyurethane-based layers discussed above. If crosslinking is desired, any suitable method can be used for the same. An exemplary discussion of crosslinked topcoats can be found in U.S. Pat. No. 6,383,644 and corresponding European Patent No. 1 004 608.

When applying the protective sheet to a composite article, particularly in applications where composite articles and respective processing equipment have irregular-shaped surfaces, extensibility of the protective sheet is important. Protective sheets described in co-pending U.S. provisional patent application No. 60/728,987, filed on Oct. 21, 2005, and entitled "Protective Sheets, Articles, and Methods," incorporated herein by reference in its entirety, were found to be significantly more extensible than certain commercially available protective sheets having a crosslinked topcoat. Accordingly, in a further embodiment, protective sheets of the invention comprise an essentially uncrosslinked topcoat. In many applications where protective sheets are used, the potential benefits imparted by crosslinking an exterior layer were substantially outweighed by the significantly improved extensibility provided by protective sheets without a crosslinked exterior layer.

Use of extensible protective sheets according to an exemplary embodiment of the invention imparts significant advantages, particularly when applying the protective sheet to irregular-shaped surfaces. Further, use of extensible protective sheets in this manner better allows for full coverage of the composite article's outer surface with the protective sheet in certain embodiments of the invention. As noted above, full coverage can be beneficial for many applications in enhancing containment of the underlying composite material so as to increase safety and durability when using the composite article.

Several exemplary protective sheets applicable for use according to the invention are readily available on the market today and can be applied to the composite article without the additional use of a gel coat or similar protective coating. For example, Minnesota Mining & Manufacturing Co. ("3M") in St. Paul, Minn., markets polyurethane-based sheet "Paint Protection Film" under the SCOTCHGARD product line. See also U.S. Pat. No. 6,383,644. As another example, Venture Tape Corp. in Rockland, Mass., markets such sheets (e.g., designated by product numbers 7510, 7512, and 7514) using the VENTURESHIELD trade designation. Avery Dennison in Strongsville, Ohio markets polyurethane products using the STONESHIELD trade designation. Protective sheets are available from entrotech, inc. of Columbus, Ohio under the ENTROFILM trade designations (e.g., entrofilm 843 and entrofilm 861) and others described in co-pending U.S. Provisional Patent Application No. 60/728,987, filed on Oct. 21, 2005, and entitled "Protective Sheets, Articles, and Methods."

According to the invention, a protective sheet is bonded to an underlying composite article using any suitable method. For example, the protective sheet can be adhered to an underlying composite article using an indirect bonding method. When indirectly bonded, the protective sheet is adhered to the underlying composite article using one or more additional layers therebetween. As another example, the protective sheet can be directly bonded to the exterior surface of a composite article. When directly bonded, the protective sheet is adhered to the underlying composite article without the use of any additional layers (e.g., adhesives, intermediate coatings, or tie layers) therebetween. While some of the methods described hereinbelow were found useful for integrally bonding protective sheets to surfaces other than those of a composite article, the methods are particularly well-suited for forming improved composite articles of the present invention.

One indirect bonding method involves the application of adhesives, intermediate coatings, or tie layers between the protective sheet and the underlying composite article. When adhesives are used, they are preferably selected to form essentially permanent bonds between the protective sheet and underlying composite article. Thus, thermoset adhesives (e.g., epoxy adhesives) are one candidate for that embodiment. Adequately formulated pressure sensitive adhesives can also be used in other embodiments.

For maximized process efficiency, direct bonding methods are preferred. One direct bonding method involves contacting the protective sheet with and then crosslinking the protective sheet with the matrix material of the underlying composite article. Crosslinks are typically relatively strong covalent bonds between the protective sheet and the underlying composite article. For example, as the matrix material of an underlying composite article cures (e.g., when a matrix material comprises a thermoset material), crosslinks form between the surface being cured and the surface of the protective sheet in contact therewith.

In an exemplary embodiment, the matrix material comprises a thermoset epoxy resin (e.g., Bisphenol-A and/or Bisphenol-F epoxy resin) and the protective sheet is polyurethane-based (e.g., comprising an aliphatic polyurethane, such as a polycaprolactone-based aliphatic polyurethane and/or a polycarbonate-based aliphatic polyurethane). Without being bound by any particular theory, it is believed that any residual isocyanate-functional groups within the polyurethane-based protective sheet react with hydroxy-functional groups within the matrix material to form strong covalent bonds between the protective sheet and the underlying composite article. This chemical reaction can be further enhanced when the epoxy resin is cured under heat and pressure while in intimate contact with the polyurethane-based protective sheet (e.g., as is typically the case when processed within a mold). Under such in-mold process conditions, when the polyurethane-based protective sheet is subjected to relatively high pressure and elevated temperatures, it is believed that the polyurethane-based protective sheet exhibits reversible thermolysis. During thermolysis, a portion of the urethane bonds within the polyurethane-based protective sheet transform to non-bonded isocyanate-functional and hydroxy-functional groups. Thus, with greater presence of isocyanate functionality during the cure cycle, additional crosslinking of the polyurethane-based protective layer with the epoxy matrix material occurs.

Yet another direct bonding method involves lamination. Lamination techniques include those using heat and/or pressure to adhere a protective sheet to an underlying composite article after the composite article has previously been formed (e.g., via a molding process). As such, if the matrix material is a thermoset, it will already have been cured prior to bonding of the protective sheet to the composite article. However, under certain conditions, there may still be residual hydroxy-functional or other functional groups remaining in the matrix material to facilitate crosslinking of the matrix material with the protective sheet as discussed above. In other instances, the nature of the direct bonding of the protective sheet is a function of the amount of heat and/or pressure utilized to adhere the protective sheet to the composite article.

The protective sheet can be applied to the exterior surface of a composite article using in-mold, insert-mold, or co-mold processing techniques. The latter is sometimes referred to in terms of being a "reactive" molding technique.

In an exemplary embodiment, at least one exterior surface of a composite article to be protected is integrally formed in the presence of at least one protective sheet. "Integrally formed" refers to those exterior surfaces that are molded or otherwise fabricated in the presence of the protective sheet such that the two become integrally bonded during such formation.

When the composite article is molded, the protective sheet can be applied using in-mold, insert-mold, or co-mold processing techniques according to this exemplary embodiment. When formed in such a manner, beneficial properties associated with the protective sheet being positioned on an exterior surface of the composite article are maximized, as protective sheets and protective coatings adhered using other methods are generally more prone to failure. In addition, in-mold, insert-mold, and co-mold processing results in manufacturing efficiencies realized by, for example, elimination of processing steps secondary to composite article formation and elimination of intermediate layers (e.g., those comprising adhesive bonding materials) and associated processing steps in many applications.

As discussed above, a wide variety of materials can be used for protective sheets of the invention. Protective sheets of the invention are readily adapted for in-mold, insert-mold and co-mold processing techniques according to knowledge of those skilled in the art. Significant advantages are imparted when using such exemplary methods. For example, protective sheets applied using in-mold and insert-mold processing techniques provide processing efficiencies and improved performance properties arising from the improved integral bonding between the protective sheet and underlying surface as compared to otherwise adhering the protective sheet to the same surface after its formation. Integral bonds achieved with in-mold and insert-mold processing result in the protective sheet being less susceptible to shifting or sliding when a composite article comprising the same is in use.

Similar enhancements are obtained when protective sheets of the invention are co-molded with a composite article in applying a protective sheet to the outer surface thereof. Co-molding, sometimes referred to as reactive molding, refers to over-molding of a composite article with a protective sheet by applying the protective sheet to a molded composite article's surface and then further molding the composite article to sufficiently bond the protective sheet to the article's surface. As discussed above, as the matrix material of the underlying composite article cures (e.g., when the matrix material comprises a thermoset material), crosslinks form between the surface being cured and the surface of the protective sheet in contact therewith.

Each suitable processing technique is susceptible to many variations as understood by those of ordinary skill in the art. For example, in-mold and insert-mold processing, which involve placement in a mold of a protective sheet to be integrally bonded with an article being formed within the mold, can be done using a variety of composite molding techniques. Such molding techniques include compression, bladder, vacuum bag, autoclave, resin transfer molding (RTM), vacuum-assisted RTM, and other similar methods known to those of ordinary skill in the art.

One method of manufacturing composite articles involves the use of prepreg. "Prepreg" refers to pre-impregnated composite reinforcement material, where the prepreg contains an amount of matrix material used to bond the reinforcement material together and to other components during manufacture. Unlike RTM methods, compression, bladder, vacuum bag, autoclave, and similar methods typically involve the use of a prepreg containing both the reinforcement material and the matrix material during molding.

With compression, bladder, vacuum bag, autoclave, and similar methods involving the use of prepreg, a protective sheet is first positioned within a suitable mold. One or more layers of prepreg are then positioned within the mold prior to initiating cure of the prepreg's matrix material. During such curing, which is often effected using heat and pressure, the protective sheet becomes integrally bonded to at least a portion of at least one surface of the composite article. According to a particularly preferred embodiment, crosslinks form between the protective sheet and the prepreg's matrix material during curing.

With RTM, vacuum-assisted RTM, and similar methods, a protective sheet is placed within a mold containing reinforcement material for the composite article to be formed. Matrix material is then injected into the mold to form a composite article of the invention. Those of ordinary skill in the art are readily familiar with injectable matrix materials and techniques for their use in injection molding. The matrix material itself is generally heated to, for example, a semi-molten state for injection molding. The term "semi-molten" means capable of flowing into the molding area.

Prior to and during injection of the matrix material, the protective sheet can be stabilized within the mold using any suitable method and apparatus, including the many methods associated with in-mold decoration. Such methods include those using gravity, air pressure, pins, tape, static electricity, vacuum, and/or other suitable means. In addition, release agents and other molding components can be used as readily understood by those skilled in the art.

Although not required, according to one variation of this embodiment, the protective sheet is heated prior to injecting the matrix material into the mold and against the backside of the protective sheet. For example, one variation of this embodiment relates to insert-mold processing. During insert-mold processing, as compared to in-mold processing, the protective sheet is thermoformed into a three-dimensional shape prior to injection of the matrix material. Typically, the protective sheet is shaped to approximate the contour of the interior surface of the mold into which it is placed for injection molding. In an exemplary embodiment, the thermoforming step occurs within the mold such that it does not require transfer prior to injection of the matrix material. During in-mold processing, the protective sheet changes shape, if at all, upon injection molding of the matrix material.

According to one aspect of this embodiment, any suitable injection molding apparatus is used for RTM molding. Typically, such molding apparatus have one or more orifices for injection of matrix material into the mold. According to RTM and similar methods, with the mold closed, uncured matrix material (e.g., thermoset resin) is injected into the mold, after which it flows into interstices within the reinforcement material under heat and pressure while curing. Pressure from injecting matrix material into the mold combined with the temperature within the mold and the surface of associated mold parts causes the matrix material to fuse together with or bond to the interior surface of the protective sheet (i.e., it becomes integrally bonded).

In an exemplary method of the invention, vacuum bag processing techniques are used to integrally bond protective sheets through in-mold processing. During vacuum bag processing, a prepreg assembly is compacted against a mold surface while a vacuum is pulled across the entire assembly and mold to remove excess air, matrix material, or other volatiles from the assembly. While the vacuum is being pulled, the mold is heated to cure the matrix material of the prepreg. According to a preferred embodiment, the vacuum itself provides all the pressure necessary to effect full cure of the matrix material.

FIG. 1 is a cross-sectional representation of an exemplary vacuum bag in-mold processing configuration for application of protective sheets 102 of the invention. Although the protective sheet 102 is illustrated as a single layer, as discussed above, the protective sheet may actually consist of multiple layers. The protective sheet 102 is placed against the surface of the mold 104. As known in the art, the mold 104 may optionally have a release agent applied to its surface in order to assist with removal of the final composite article from the mold 104 after the in-mold process is complete. On the opposite side of protective sheet 102, one or more layers of prepreg 106 are positioned in contact with the protective sheet 102. On the opposite side of the prepreg 106, a peel ply release layer 108 is positioned. The peel ply release layer 108 is typically porous or perforated to allow excess matrix material from the prepreg 106 to flow out of and to be removed from the composite article. Opposite the peel ply release layer 108, a bleeder fabric layer 110 is positioned to absorb excess resin flowing through the peel ply release layer 108. Opposite the bleeder fabric layer 110, a separator release layer 112 is positioned to prevent excess resin from flowing into an adjacent breather fabric layer 114. The separator release layer 112 is often perforated to provide an air channel for the vacuum into the breather fabric layer 114. The breather fabric layer 114 is positioned opposite the separator release layer 112 and wraps around the other layers to extend to the vacuum nozzle port 116. The breather fabric layer 114 provides an air channel from the composite article to the vacuum nozzle port 116. The entire assembly is sealed within a vacuum by using sealant 120 to seal a vacuum bagging film 118 against the surface of the mold 104. By operatively coupling a vacuum pump (not shown) to the vacuum nozzle port 116, air can be removed from within the entire vacuum bag assembly. This compresses the vacuum bagging film 118 against all other layers in the assembly to exert pressure against the surface of mold 104. A vacuum of between about 81 kPa to about 91 kPa (about 24 inches mercury to about 27 inches mercury) is typically pulled. Once the vacuum is pulled, the entire mold and vacuum bag assembly is placed into an oven (or otherwise heated) to cure the matrix material of the prepreg 106. The temperatures used to cure the matrix material will depend upon the specific matrix material utilized in the prepreg. Exemplary heating times range from about 30 minutes to about 2 hours.

EXAMPLES

Exemplary embodiments and applications of the invention are described in the following non-limiting examples and related testing methods.

Tensile Testing Method

For tensile testing, samples were formed into standard tensile testing specimens according to ASTM D638-95 using designations for Type II measurements. Tensile testing was performed according to ASTM D638-95. The rate at which the jaws holding the specimen were pulled in a tensile manner was 1.0 millimeter/minute (0.04 inch/minute) to measure the elastic modulus of the sample, but increased to 300 millimeters/minute (11.8 inches/minute) to obtain the ultimate tensile strength and elongation data. Test data using this method is reported in Table 1.

Recovery Testing Method

For recovery testing, a generally rectangular sample having an initial length of 25 centimeters (10 inches) and width of 5 centimeters (2 inches) was prepared. The sample was stretched in tension until its length exceeded its initial length by a predetermined percentage (25% or 50%). After recovery equilibrium was obtained (approximately 5-10 minutes), the length of the relaxed sample was measured and the sample was qualitatively analyzed for defects or deformation. The change in length of the sample as compared to the initial length is reported as its "Percent Deformation" in Table 2. Note that values reported in Table 2 have a standard deviation of about plus/minus 0.6%.

Elongation Force Testing Method

Force required to elongate a generally rectangular sample having an initial length of 12.5 centimeters (5 inches) and width of 5 centimeters (2 inches) was measured using an IMASS SP2000 slip/peel tester (available from IMASS, Inc. of Accord, Mass.) operating at a speed of 30 centimeters/minute (12 inches/minute). Two forces were measured for each sample, those being that required to elongate the sample to 125% of its initial length and that required to elongate the sample to 150% of its initial length. The forces so measured are also reported in Table 2.

Weathering Testing Method

Where indicated, samples were tested for weathering resistance using a well-known QUV test method and weatherometer. The weathering conditions were as set forth in ASTM D4329.

Example 1

An extensible polyurethane-based protective sheet was prepared such that the sheet comprised a carrier layer having a thickness of 150 microns, a topcoat layer having a thickness of 18 microns, and an adhesive layer having a thickness of 60 microns. The adhesive layer was adhered to the opposite side of the carrier layer from the topcoat layer. A standard release liner was positioned exterior to the adhesive layer, but was removed prior to testing.

To prepare the sheet, first a 98# polyethylene-coated kraft paper with silicone coated on one side was used as a release liner onto which the adhesive layer was formed. The adhesive layer was formed from an adhesive composition prepared by charging a closed vessel with initial components as follows: 20% by weight 2-ethyl hexyl acrylate, 5% by weight methyl acrylate, 1% by weight acrylic acid, 37% by weight ethyl acetate, 7% by weight isopropyl alcohol, 26.1% by weight toluene, and 3.75% by weight n-propanol. The weight percentages of each component were based on total weight of the reaction components, which also included 0.15% by weight benzoyl peroxide (98%) added in partial increments. To the initial components, 10% by weight of the benzoyl peroxide was first added. Then, the components were charged under a nitrogen atmosphere and using agitation. The vessel was heated at 80° C. until exotherm was reached. The exotherm was maintained by addition of the remaining benzoyl peroxide. After the benzoyl peroxide was depleted and the exotherm was complete, aluminum acetal acetonate was added to the polymerized solution in the amount of 0.4% by weight based on solid weight of the polymer.

This adhesive composition was coated onto the release liner and dried in a 14-zone oven, at 20 seconds per zone, with the zone temperatures set as follows: zone 1 (50° C.), zone 2 (60° C.), zone 3 (70° C.), zone 4 (80° C.), zone 5 (90° C.), zone 6 (90° C.), zones 7-10 (100° C.), and zones 11-14 (120° C.). With drying, the aluminum acetal acetonate functioned to crosslink the polymer. The thickness of the adhesive layer thus formed was 60 microns. The construction was then run through a chill stack to reduce the temperature to about 30° C.

A 150-micron-thick film of extruded aliphatic polyurethane, available from Stevens Urethane under the trade designation, SS-2219-92, was then provided and laminated to the exposed adhesive layer. This further construction was run through the 14-zone oven and then again chilled to about 30° C.

Meanwhile, an 18-micron-thick film for the topcoat layer was formed on a 76-micron thick (3-mil-thick) silicone-coated polyester carrier film. The film was formed by solution coating the polyurethane-based composition described below on the supporting carrier film. After the composition was coated on the carrier film, it was run through the 14-zone oven and then chilled to about 30° C.

The polyurethane-based composition was prepared by charging a closed vessel with 7.36% by weight of a hybrid linear hexane diol/1,6-polycarbonate polyester having terminal hydroxyl groups, 43.46% by weight toluene, 43.46% by weight isopropyl alcohol, and 0.03% by weight dibutyl tin laureate. The weight percentages of each component were based on total weight of the reaction components, which also included 5.68% by weight isophorone diisocyanate added later. The components were charged under a nitrogen atmosphere and using agitation. After the vessel was heated to 90° C., 5.68% by weight isophorone diisocyanate was continually added to the vessel through the resultant exotherm. After the exotherm was complete, the composition was maintained at 90° C. for one additional hour while still using agitation.

Once the topcoat layer was thus formed, it was thermally bonded to the exposed surface of the carrier layer. During thermal bonding, the carrier layer and the topcoat layer were contacted for about three seconds with application of heat 150° C. (300° F.) and 140 Pa (20 psi) pressure. Prior to testing, the release liner and carrier film were removed.

All of the individual components used in preparation of the protective sheet are readily available from a variety of chemical suppliers such as Aldrich (Milwaukee, Wis.) and others. For example, the isopropyl alcohol and toluene can be obtained from Shell Chemicals (Houston, Tex.).

Samples of the protective sheet were then tested according to the Tensile Testing Method, Recovery Testing Method, and Elongation Force Testing Method described above. Test data is reported in Table 1. Further, samples of the protective sheet were tested according to the Weathering Testing Method described above. After weathering for 500 hours, no visible yellowing was observed by the unaided human eye. Finally, samples of the protective sheet were tested for deglossing by placing them in an outside environment in the states of Florida and Arizona for approximately one year. After one year, no visible deglossing was observed by the unaided human eye.

TABLE 1

| Test Temperature (° C./° F.) | Ultimate Tensile Strength (MPa/psi) | Elastic Modulus (MPa/psi) | Elongation at Break (%) |
|---|---|---|---|
| 24/75 | 58.4/8,460 | 61/8,800 | 390 |

TABLE 2

| Percent Deformation After 25% Elongation | Force Required to Elongate to 125% Initial Length (Newtons/pounds-force) | Percent Deformation After 50% Elongation | Force Required to Elongate to 150% Initial Length (Newtons/pounds-force) |
|---|---|---|---|
| −0.3 | 6.1/1.4 | −0.6 | 18.9/4.3 |

Examples 2A-2C

For each fiber-reinforced composite, a woven carbon fiber fabric containing about 3K tow-weight carbon fiber is used. Such fibers and fabric are available from a variety of commercial suppliers, including A&P Technologies (Cincinnati, Ohio), Fabric Development, Inc. (Quakertown, Pa.), and Textile Products, Inc. (Anaheim, Calif.). For each of Examples 2A-2C, a different uncured epoxy resin composition is used to impregnate the woven carbon fiber fabric. Formulation of the epoxy resin composition for each of Examples 2A-2C is described further below.

After preparation of the epoxy resin composition and hand impregnation of the woven carbon fiber fabric therewith, four layers of the now impregnated "prepreg" carbon fiber fabric are stacked upon one another.

As an outer layer, a 150-µm (0.006-inch) thick film of a polycaprolactone-based, aliphatic thermoplastic polyurethane film (available from Argotec, Inc. of Greenfield, Mass.) is positioned on top of the four stacked layers of prepreg carbon fiber fabric. The resulting 5-layer structure is then placed into a heated platen press for a period of about 45 minutes, at a temperature of about 120° C. (250° F.) and an applied pressure of about 0.34 MPa (50 psi). During this step, the epoxy resin composition is cured. The sample is then removed from the platen press and allowed to cool.

Any suitable epoxy resin composition can be used in this process. A number of commercial suppliers and published documents provide formulation guidelines for epoxy resin systems (e.g., "EPON® Resin Chemistry" published by Resolution Performance Products). Most Bisphenol-A and Bisphenol-F epoxy resins are expected to be suitable for use as the epoxy resin according to these Examples 2A-2C. Most amine-curing agents are expected to be suitable for use therein as well.

Resin Formulation 2A

As recommended in the company's data sheet for Amicure CG-1200 (an amine curing agent available from Air Products and Chemicals, Inc. of Allentown, Pa.), a suitable epoxy resin formulation is as follows:

Amicure CG-1200, in the amount of 4-15 phr (parts per hundred weight epoxy resin), is added to an epoxy resin having an epoxide equivalent weight (EEW) of 190. Numerous examples of Bisphenol-F and Bisphenol-A epoxy resins with an EEW of approximately 190 are commercially available, including for example, EPON Resin 828 (a Bisphenol-A epoxy resin available from Resolution Performance Products of Houston, Tex.).

Resin Formulation 2B

As recommended in the company's data sheet for Amicure UR (an amine curing agent available from Air Products and Chemicals, Inc. of Allentown, Pa.), a suitable epoxy resin formulation is as follows:

Amicure CG-1200 (an amine curing agent available from Air Products and Chemicals, Inc. of Allentown, Pa.), in the amount of 6 phr, is added to an epoxy resin having an EEW of 190. Numerous examples of Bisphenol-F and Bisphenol-A epoxy resins with an EEW of approximately 190 are commercially available, including for example, EPON Resin 828 (a Bisphenol-A epoxy resin available from Resolution Performance Products of Houston, Tex.). In addition, Amicure UR cure accelerator (a substituted urea-based accelerator available from Air Products and Chemicals, Inc. of Allentown, Pa.) is added in the amount of 2 phr.

Resin Formulation 2C

As recommended in the company's data sheet for Ancamine 2441 (a modified polyamine curing agent available from Air Products and Chemicals, Inc. of Allentown, Pa.), a suitable epoxy resin formulation is as follows:

Ancamine 2441 in the amount of 5 phr, is added to an epoxy resin having an EEW of 190. Numerous examples of Bisphenol-F and Bisphenol-A epoxy resins with an EEW of approximately 190 are commercially available, including for example, EPON Resin 828 (a Bisphenol-A epoxy resin available from Resolution Performance Products of Houston, Tex.). In addition, Amicure CG-1200 (an amine curing agent available from Air Products and Chemicals, Inc. of Allentown, Pa.), in the amount of 6 phr, is added to the epoxy resin.

Example 3

Several layers of carbon fiber prepreg were prepared by hand-coating sufficient epoxy thermoset resin into a 12K woven carbon fiber fabric. The epoxy resin formulation was prepared based on 100 phr of EPON 863 (a Bisphenol-F epoxy resin available from Resolution Performance Products of Houston, Tex.), 22.4 phr of Ancamine 2441 (a modified polyamine curing agent available from Air Products and Chemicals, Inc. of Allentown, Pa.), and 5 phr of CAB-O-SIL TS-720 (a treated fumed silica available from Cabot Corporation of Billerica, Mass.). A protective sheet was directly bonded to the resulting epoxy-carbon fiber composite article using in-mold vacuum bag processing. The protective sheet consisted of a 150-μm (0.006-inch) thick film of a polycaprolactone-based, aliphatic thermoplastic polyurethane film (available from Argotec, Inc. of Greenfield, Mass. under the trade designation ARGOTEC 49510).

A flat aluminum plate was used as a vacuum bag mold surface. Prior to configuring a vacuum bag assembly thereon, the aluminum plate was cleaned and treated with the Waterworks Aerospace Release System available from Waterworks of East Ellijay, Ga. The vacuum bag assembly was constructed utilizing the following material components: Vacuum Bagging Film (a modified nylon blue vacuum bagging film available from The Composites Store, Inc. of Tehachapi, Calif.), Sealant Tape (available from The Composites Store, Inc. of Tehachapi, Calif. under the description "Yellow Super Seal Tacky Tape"), Breather Fabric (non-woven polyester fabric available from Richmond Aircraft Products, Inc. of Norwalk, Calif. under the trade designation, A 3000), Separator Release Film (perforated, violet FEP fluorocarbon release film available from Richmond Aircraft Products, Inc. of Norwalk, Calif. under the trade designation, A5000 Release Film), Bleeder Fabric (non-woven polyester fabric available from Richmond Aircraft Products, Inc. of Norwalk, Calif. under the trade designation, A 3000), and Peel Ply Release Film (PTFE-coated fiberglass fabric available from Airtech International, Inc. of Huntington Beach, Calif. under the trade designation, RELEASE EASE 234TFP).

The protective sheet was placed adjacent the aluminum plate. Then, four approximately 8-cm×13-cm (3-in×5-in) layers of the 12K carbon fiber prepreg were stacked on the protective sheet for processing in the vacuum bag assembly. After assembly of the vacuum bag system was complete, a vacuum was pulled on the prepreg stack for about 10 minutes to compress the various layers. While still pulling the vacuum, the entire assembly was placed into an oven at 120° C. (250° F.) for 60 minutes to cure the epoxy resin.

After cooling, the resulting carbon fiber composite articles were removed. Upon visual inspection, it was noted that the protective sheet was intimately bonded to the carbon fiber composite article. Surface finish of the protective sheet mirrored that of the aluminum plate.

Example 4

Two layers of carbon fiber prepreg braid were prepared by hand coating sufficient epoxy thermoset resin into a 3K-braided carbon fiber sock. The epoxy resin formulation was prepared based on 100 phr of EPON 863 (a Bisphenol-F epoxy resin available from Resolution Performance Products of Houston, Tex.), 22.4 phr of Ancamine 2441 (a modified polyamine curing agent available from Air Products and Chemicals, Inc. of Allentown, Pa.), and 5 phr of CAB-O-SIL TS-720 (a treated fumed silica available from Cabot Corporation of Billerica, Mass.). A protective sheet was directly bonded to the resulting epoxy-carbon fiber composite article using a bladder molding process. The protective sheet consisted of a single layer of 0.35-mm (0.014-inch) aliphatic polyurethane film (available from Argotec, Inc. of Greenfield, Mass. under the trade designation ARGOTEC 49510).

The tubular cavity of a two-piece aluminum mold was used to define the outer surface of a lacrosse stick shaft to be formed from a composite material. The mold was approximately 81 centimeters (32 inches) in length and approximately 2.5 centimeters (1 inch) in diameter and was configured as an octagonal shape, which is common to lacrosse stick shafts. Prior to configuring the mold assembly, the protective sheet was applied to the tubular cavity, which was first coated with FEP release agent. An inflatable mandrel was constructed by fixturing a tubular latex bladder (available from Latex Technology Inc. of San Marcos, Calif.) over a steel tube attached to a supply of pressurized air. The prepreg braid was placed over the inflatable mandrel and the assembly was inserted into the mold cavity.

Pressurized air was applied to the inflatable mandrel causing the bladder to inflate and moving the prepreg braid into contact with the protective sheet against the mold surface. Pressure inside the bladder was increased to 0.17 MPa (25 psi) in order to compress the layers of prepreg braid and integrally bond the prepreg braid and the protective sheet. The mold was heated 5° C. per minute to 120° C., at which point it was held at 120° C. for 45 minutes to allow the epoxy resin to cure.

After cooling, the resulting carbon fiber composite lacrosse stick shaft was removed. Upon visual inspection, it was noted that the protective sheet was integrally bonded to the carbon fiber composite article. Surface finish of the protective sheet mirrored that of the aluminum mold.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited.

The invention claimed is:

1. A composite article comprising at least one composite material and further comprising an extensible protective sheet integrally bonded to at least one rigid surface thereof,
   wherein at least a portion of the protective sheet is crosslinked with at least a portion of the composite article, and
   wherein the extensible protective sheet is no greater than about 1.1 mm (0.045 inch) thick at its maximum thickness; and wherein the protective sheet comprises at least one elastomeric material.

2. The composite article of claim 1, wherein the composite article comprises a fiber-reinforced composite material underlying the protective sheet.

3. The composite article of claim 1, wherein the composite article has at least one exterior surface comprising a composite material and wherein the protective sheet fully covers the exterior surface comprising the composite material.

4. The composite article of claim 1, wherein the composite article is fully covered by the protective sheet.

5. The composite article of claim 1, wherein the composite article comprises at least a portion of a motorized vehicle.

6. The composite article of claim 1, wherein the composite article comprises at least a portion of an aerospace component.

7. The composite article of claim 1, wherein the composite article comprises at least a portion of a shaft-based sporting implement.

8. The composite article of claim 1, wherein the elastomeric material is based on polyurethane, ionomer, or fluoroelastomer chemistry.

9. The composite article of claim 1, wherein the protective sheet comprises at least one polyurethane-based layer.

10. The composite article of claim 9, wherein the polyurethane-based layer comprises at least one aliphatic-based polyurethane.

11. The composite article of claim 1, wherein the composite article is based on at least one thermoplastic resin.

12. The composite article of claim 1, wherein the composite article is based on at least one thermoset resin.

13. The composite article of claim 1, wherein the composite article is based on at least one epoxy resin.

14. The composite article of claim 13, wherein the epoxy resin is selected from a Bisphenol-A epoxy resin and a Bisphenol-F epoxy resin.

15. The composite article of claim 1, wherein the composite article is based on at least one epoxy resin and the protective sheet comprises at least one polyurethane-based layer.

16. The composite article of claim 1, wherein the composite material comprises a continuous reinforcing material.

17. The composite article of claim 16, wherein the continuous reinforcing material is woven, braided, or in the form of a mat.

18. A method of applying an extensible protective sheet to at least a portion of an exterior surface of a composite article comprising at least one composite material, the method comprising:
   providing the extensible protective sheet prior to forming the exterior surface of the composite article; and
   integrally forming the exterior surface of the composite article in the presence of the extensible protective sheet such that at least a portion of the exterior surface of the composite article and the extensible protective sheet become integrally bonded and wherein at least a portion of the extensible protective sheet is crosslinked with the at least a portion of the exterior surface of the article; and wherein the protective sheet comprises at least one elastomeric material.

19. The method of claim 18, wherein the exterior surface of the composite article is formed using an in-mold processing or insert-mold processing technique.

20. The method of claim 18, wherein the exterior surface of the composite article is formed using a vacuum bag processing technique.

21. The method of claim 18, wherein the exterior surface of the composite article comprises a fiber-reinforced composite material prior to application of the protective sheet to at least a portion thereof.

22. The method of claim 18, wherein the protective sheet undergoes thermolysis during cure of the composite article.

23. The method of claim 18, wherein the composite article comprises the composite article of claim 1.

24. A method of applying an extensible protective sheet to at least a portion of an exterior surface of a composite article comprising at least one composite material, the method comprising:
   providing the extensible protective sheet;
   forming the exterior surface of the composite article; and
   co-molding the extensible protective sheet to the exterior surface of the composite article such that at least a portion of the exterior surface of the composite article and the extensible protective sheet become integrally bonded; and wherein the protective sheet comprises at least one elastomeric material.

25. The method of claim 24, wherein the exterior surface of the composite article comprises a fiber-reinforced composite material.

26. An article comprising an exterior protective sheet adhered to an underlying composite material surface of a composite article,
   wherein the article is essentially free of additional layers between the protective sheet and the underlying composite material surface, and
   wherein the protective sheet is no greater than about 1.1 mm (0.045 inch) thick at its maximum thickness; and wherein the protective sheet comprises at least one elastomeric material.

27. The article of claim 26, wherein the composite article comprises printed material on at least one outwardly visible surface thereof.

28. The article of claim 26, wherein the composite material comprises a fiber-reinforced composite.

29. The composite article of claim 26, wherein the composite material comprises a continuous reinforcing material.

30. The composite article of claim 29, wherein the continuous reinforcing material is woven, braided, or in the form of a mat.

31. A composite article comprising at least one composite material and further comprising a protective sheet integrally bonded to at least one portion thereof, wherein the composite article is based on at least one thermoset resin, and wherein the protective sheet is no greater than about 1.1 mm (0.045 inch) thick at its maximum thickness; and wherein the protective sheet comprises at least one elastomeric material.

32. The composite article of claim 31, wherein the composite material comprises a continuous reinforcing material.

33. The composite article of claim 32, wherein the continuous reinforcing material is woven, braided, or in the form of a mat.

* * * * *

UNITED STATES PATENT AND TRADEMARK OFFICE
CERTIFICATE OF CORRECTION

PATENT NO.       : 8,545,959 B2                           Page 1 of 1
APPLICATION NO.  : 12/089395
DATED            : October 1, 2013
INVENTOR(S)      : McGuire, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Fifteenth Day of September, 2015

Michelle K. Lee
*Director of the United States Patent and Trademark Office*